United States Patent [19]

Lu et al.

[11] Patent Number: 5,402,392
[45] Date of Patent: Mar. 28, 1995

[54] DETERMINING ORIENTATION OF VERTICAL FRACTURES WITH WELL LOGGING TOOLS

[75] Inventors: Chih-Ping J. Lu, Sugar Land; Long D. Pham, Houston; Sen-Tsuen Chen, Sugar Land, all of Tex.

[73] Assignee: Exxon Production Research Company, Houston, Tex.

[21] Appl. No.: 104,444

[22] Filed: Aug. 10, 1993

[51] Int. Cl.⁶ .............................................. G01V 1/40
[52] U.S. Cl. .................................... 367/75; 367/25; 367/35; 181/102; 181/106; 181/105; 166/250
[58] Field of Search ................ 367/25, 35, 36, 75, 367/911; 181/102, 105, 106; 166/250

[56] References Cited

U.S. PATENT DOCUMENTS

| | | | |
|---|---|---|---|
| 3,354,983 | 11/1967 | Erickson et al. | 367/31 |
| 4,542,487 | 9/1985 | Benzing et al. | 367/31 |
| 4,549,630 | 10/1985 | Brown | 181/106 |
| 4,698,792 | 10/1987 | Kurkjian et al. | 367/31 |
| 4,703,460 | 10/1987 | Kurkjian et al. | 367/31 |
| 4,713,968 | 12/1987 | Yale | 73/594 |
| 4,794,572 | 12/1988 | Sondergeld | 367/31 |
| 4,803,666 | 2/1989 | Alford | 367/36 |
| 4,817,061 | 3/1989 | Alford | 367/75 |
| 4,888,743 | 12/1989 | Thomsen | 367/75 |
| 4,903,244 | 2/1990 | Alford | 367/36 |
| 4,912,979 | 4/1990 | Sondergeld | 367/35 |
| 4,933,913 | 6/1990 | Thomsen | 367/75 |
| 4,951,267 | 8/1990 | Chang et al. | 367/31 |
| 5,077,697 | 12/1991 | Chang | 367/31 |

OTHER PUBLICATIONS

Winterstein, D. F., *Geophysics*, 56:1331-1348 (1991).
Winterstein, D. F., *Geophysics*, 56:1349-1364 (1991).
Alford, "Shear Data in the Presence of Azimuthal Anisotropy," 56th Ann. Intl. Mtg. Soc. Explor. Geophys., Expanded Abstract, pp. 476-479, 1986.
Li, *Geophysics*, 58:240-256 (1993).

*Primary Examiner*—J. Woodrow Eldred
*Attorney, Agent, or Firm*—Pravel, Hewitt, Kimball & Krieger

[57] ABSTRACT

The orientation of vertical fractures in subsurface rock formations is determined. A cross-dipole logging tool collects four-component shear-wave seismic data through a formation interval of interest in a subsurface formation adjacent a well bore. A gyroscope is typically provided to indicate compass orientation of the logging tool. The collected seismic data are then transformed within a time window containing arrivals of the shear waves to a new coordinate system within which the motion of the shear waves becomes linear. In the new coordinate system, the shear wave data are processed to determine the presence and orientation of fractures in the formation.

20 Claims, 7 Drawing Sheets

DETERMINING ORIENTATION OF VERTICAL FRACTURES WITH WELL LOGGING TOOLS

BACKGROUND OF THE INVENTION

1. Field of the Invention

The present invention relates to evaluation of subsurface earth formations, more particularly the detection of fractures in them.

2. Description of Prior Art

The determination of in-situ fracture orientation and fracture density in earth formations can help optimize hydrocarbon production from them. Knowledge of fracture orientation and density also provides information for horizontal drilling programs. It can also be used to evaluate the hydraulically induced fractures encountered during enhanced recovery processes.

Vertical fractures of the rocks cause an azimuthal anisotropy for shear-wave propagation. In vertical fractures of rock, the velocity of a vertically-travelling shear wave depends on whether the wave polarization is perpendicular or parallel to the direction of fracturing. Two shear waves with different speeds are known to occur. Since the wave speeds are different, a splitting of the shear waves has been observable.

Based on the principle of shear-wave splitting, two seismic methods have been used to determine the orientation of vertical fractures in the subsurface: 1) the shear-wave reflection method, and 2) the shear-wave vertical seismic profile, or VSP, method. Examples of these methods are in U.S. Pat. Nos. 4,803,666; 4,903,244; 4,817,061; 4,888,743 and 4,933,913. The reflection method has both the shear-wave sources and receivers placed on the earth surface. The VSP method is based on seismic receivers being placed in a well and the sources placed on the surface. In both cases, four-component shear-wave traces are recorded.

The data obtained from these seismic methods has typically been processed according to a rotation technique disclosed by Alford, "Shear Data in the Presence of Azimuthal Anisotropy," 56th Ann. Internat. Mtg., Soc. Explor. Geophys., Expanded Abstract, 476–479. The rotation method was applied to these traces to find the principal polarization planes of the shear waves. The fracture orientation was determined by comparing shear-wave traveltimes along the two polarization planes. The plane with the shorter traveltime is coplanar with the vertical fractures, and thus indicates the orientation of the vertical fractures.

The orientation obtained with either the surface seismic or VSP method was the "average orientation," because it represented the composite anisotropic property of the formation materials within the entire interval between the surface and the recording depth level. To be geologically meaningful, the results had to be transformed into "interval orientation" to represent the in-situ fracture orientation. This had to be done through a "layer-stripping" procedure proposed by Winterstein and Meadows. "Changes in Shear-wave polarization azimuth with depth in Cymric and Railroad Gap Oil Fields," Expanded Abstracts, 60th SEG Meeting, San Francisco 1435-1438.

There were several problems with these earlier methods. For example, both reflection and VSP shear wave data acquisition were relatively complex and expensive procedures. Further, the VSP shear wave method was limited to land seismic operations. In addition, the "layer stripping" data processing technique often was subject to large uncertainties in the processing results. Poor resolution was also a frequent problem.

SUMMARY OF THE INVENTION

Briefly, the present invention provides a new and improved method for determining fracture orientation of subsurface earth formations. A well logging tool having two orthogonally positioned sources of shear wave seismic energy and orthogonally positioned shear wave receivers is positioned in a well borehole adjacent rock formations of interest.

The sources transmit shear wave seismic energy which travels through the formation material in the vicinity of the borehole wall. The shear wave seismic energy is sensed on arrival at the receivers. Four-component seismic data groupings are obtained as a function of borehole depth with the well logging tool. The four-component seismic data includes records of shear waves received at the two receivers physically aligned with the axes of the two shear wave sources and records of shear waves received at the two receivers which are on axes physically perpendicular, or orthogonal, to the axes of the sources. Gyroscopic measurements are also made of the tool orientation with respect to a reference point, usually the earth surface.

The recorded data are then transformed to a new coordinate system in which particle motion of the split shear waves is linear. In the new coordinate system, the angle of shear wave particle motion is then determined. The shear waves are then separated into two waves travelling at different speeds, and the polarization angles of these waves determined. The angles so determined when considered with gyroscopic data indicate the orientation of the fracture or anisotropy axes of the formation. The time delay between the faster and slower shear waves is then used to determine fracture orientation as well as the degree of anisotropy, which is related to fracture density. The present invention also provides a measure of the accuracy of calculations of receiver orientation.

DESCRIPTION OF THE PREFERRED EMBODIMENT

Figure 1:
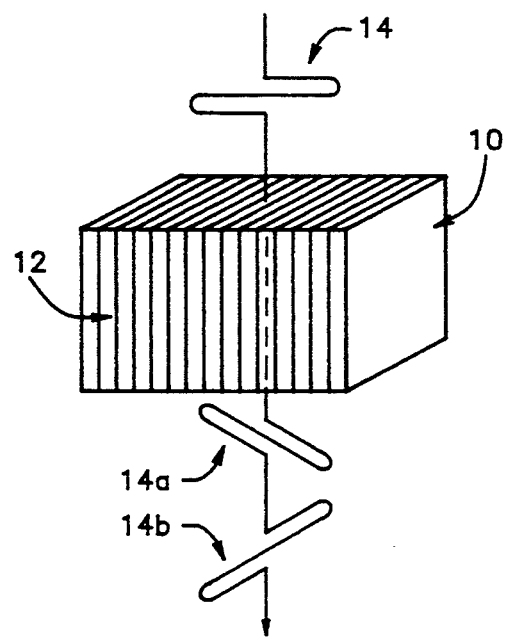
FIG. 1 is a schematic representation of seismic shear wave travel through a vertically fractured formation.

Referring to FIG. 1, a representative three-dimensional rock volume 10 of a subsurface earth formation is shown with its three orthogonal or mutually perpendicular axes for reference purposes. The formation 10 has anisotropy in that a number of generally vertically oriented fractures 12 are formed extending through it. A seismic shear wave 14 is shown travelling generally vertically through the rock volume 10.

The vertical fractures 12 of the rock 10 cause an azimuthal anisotropy for propagation of the shear wave 14. In the anisotropic rock formation 10, the velocity of the vertically travelling shear wave 14 is known to depend on its polarization, specifically whether the wave polarization is perpendicular or parallel to the direction of the fracturing 12. The vertically travelling shear wave 14 is polarized into two orthogonal components 14a and 14b, which are in effect two shear waves travelling at different speeds. Since the velocities of the waves 14a and 14b are different, a splitting of the wave 14 in effect takes place.

Figure 2:
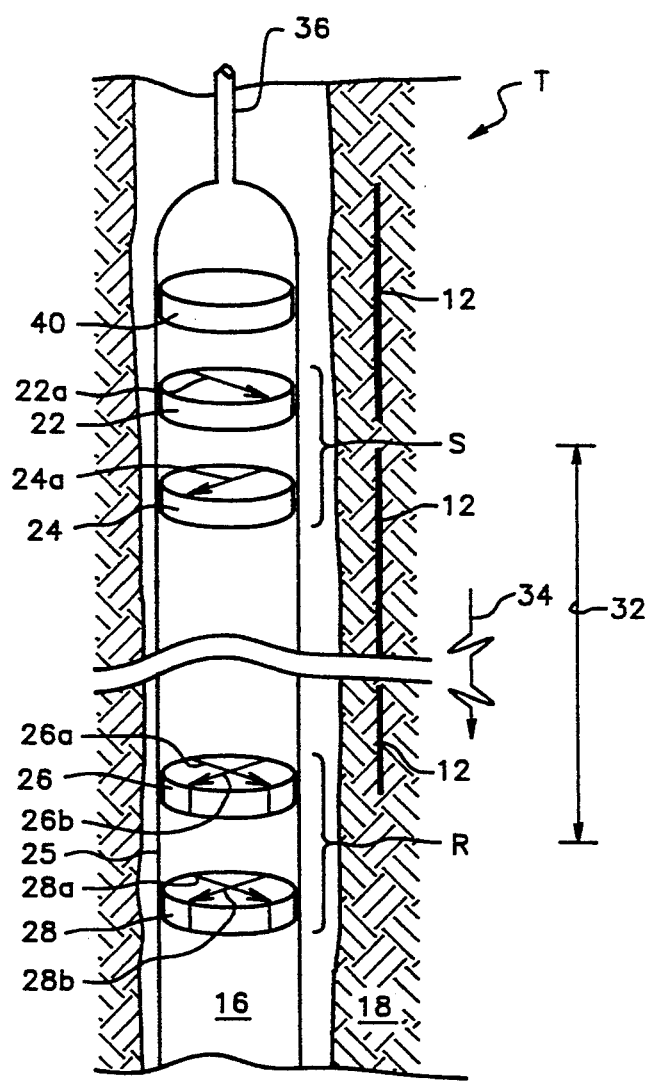
FIG. 2 is a schematic diagram of a well logging tool in a well bore used for data acquisition according to the present invention.

According to the present invention, a well logging tool T (FIG. 2) is shown in a well borehole 16, which may be a cased or uncased well, adjacent a subsurface formation 18 of interest. The well logging tool T is a cross-dipole logging tool of which several types are available. The logging tool T may be, for example, of the type available from Magnetic Pulse Incorporated, although other wireline companies offer equally suitable alternates.

The cross-dipole tool T includes at least a source array S of two dipole seismic sources 22 and 24 which are located with their axes 22a and 24a perpendicular to each other in a sonde or body 25 in the well borehole 16. The sources 22 and 24 are located at a known fixed distance, usually one foot or so, from each other in the sonde 25.

The cross-dipole tool T also includes a receiver array R of at least two pairs of orthogonal dipole receivers 26 and 28. Each of the dipole receivers 26 and 28 has an orthogonal receiver pair at a common location within it in the sonde 25. The dipole receiver 26 has a first shear wave receiver aligned along an axis 26a and a second shear wave receiver aligned along an axis 26b perpendicular or orthogonal to the axis 26a. The dipole receiver 28 has a first shear wave receiver aligned along an axis 28a and a second shear wave receiver aligned along an axis 28b perpendicular or orthogonal to the axis 28a.

The axes 26a and 28a of the dipole receivers of receiver array R are aligned in parallel with each other and with axis 22a of the source 22 in source array S. Similarly, the axes 26b and 28b of the dipole receiver array R are parallel with each other and with axis 24a of the source 24 of the source array S. The dipole receivers 26 and 28 are also each located at effectively the same vertical spacing 32 in the sonde 25 from the seismic sources 22 and 24, respectively. Since seismic sources emitting shear waves along orthogonal axes usually do not occupy the same location in the sonde 25, sources 22 and 24 are used. It is thus necessary to have the two pairs of dipole receivers, each pair spaced a like distance from one of the shear wave sources. Numerous arrangements of source-receiver pairs may be used, so long as four-component shear wave data is obtained. The four-component shear waves are signals received along two orthogonal axes as a result of emission of shear waves along each of two orthogonal axes.

It should be understood that multiple pairs or arrays of shearwave sources and receivers may be used, so long as they are spaced a like distance from each other, in order to provide additional data readings for redundancy. Where a shear wave source is capable of emitting waves in orthogonal planes from the same effective borehole depth, only a single dipole receiver with two orthogonal shear wave receivers is required.

The vertical spacing 32 between the source array S and receiver array R may be ten, twelve, or fifteen feet or more. The seismic sources 22 and 24 when active emit shear wave seismic energy a portion of which travels as indicated at 34 vertically through the formation 18 in the vicinity of the wall of borehole 15. A typical penetration is two or three feet into the formation 18 by the shear wave seismic energy. The shear wave seismic energy from sources 22 and 24 is detected by the dipole receivers 26 and 28, respectively.

The received seismic energy is converted into electrical signals in each of the receivers in receiver array R. The source array S and the receiver array R obtain at least one set of four-component shear wave data which can be transmitted via wireline 36 to surface instrumentation for recording as functions of borehole depth for further processing. The four-component traces are recorded as time series for the sources 22 and 24 as sensed by the receivers 26 and 28.

For dimensional reference and ease of illustration, the sources and receivers are further defined as follows:

X = source 22
Y = source 24
x = receiver 26
y = receiver 28; and the recorded traces are identified as follows:

Xx = time series recorded at receiver 26a of energy travelling distance 32 from source 22
Xy = time series recorded at receiver 26b of energy travelling distance 32 from source 22
Yy = time series recorded at receiver 28b of energy travelling distance 32 from source 24
Yx = time series recorded at receiver 28a of energy travelling distance 32 from source 24.

A gyroscope 40 is included in the sonde 25 to provide readings of relative compass orientation of the tool T relative to a reference point, typically the earth surface above the borehole 16. The compass orientation readings from the gyroscope 40 are also transmitted to the surface over wireline 36 for recording and processing purposes.

Figure 3A:
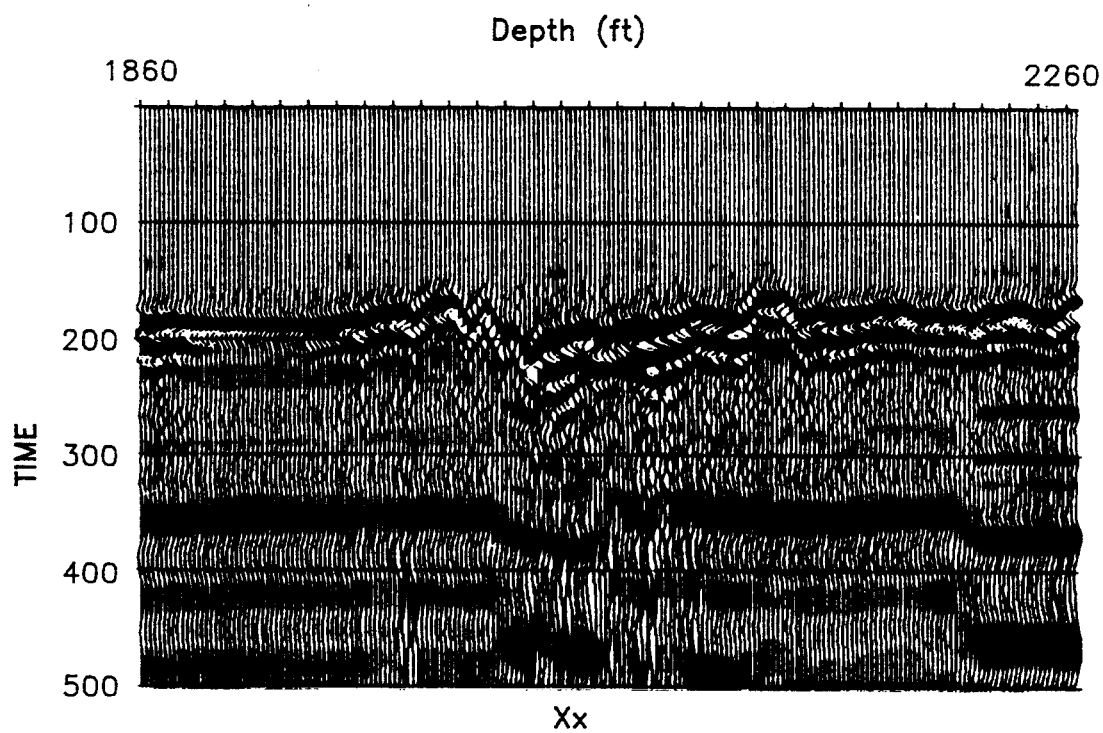
FIGS. 3A, 3B, 3C, and 3D are example plots of shear wave data obtained according to the present invention.
Figure 3B:
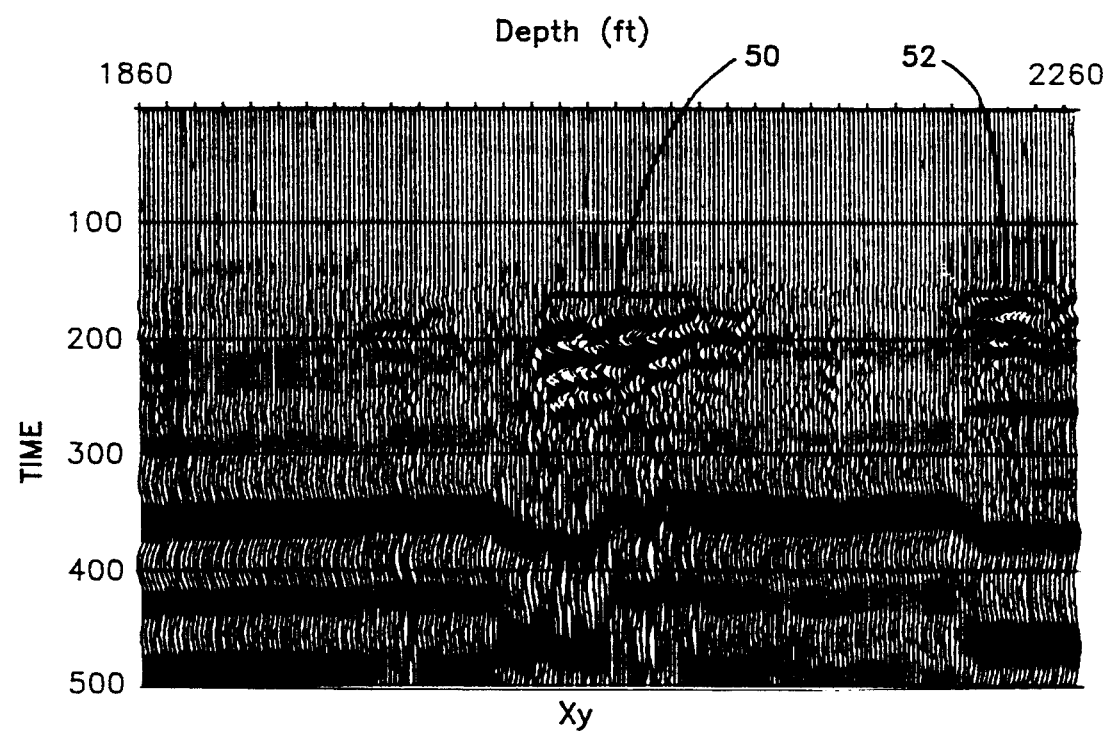
Figure 3C:
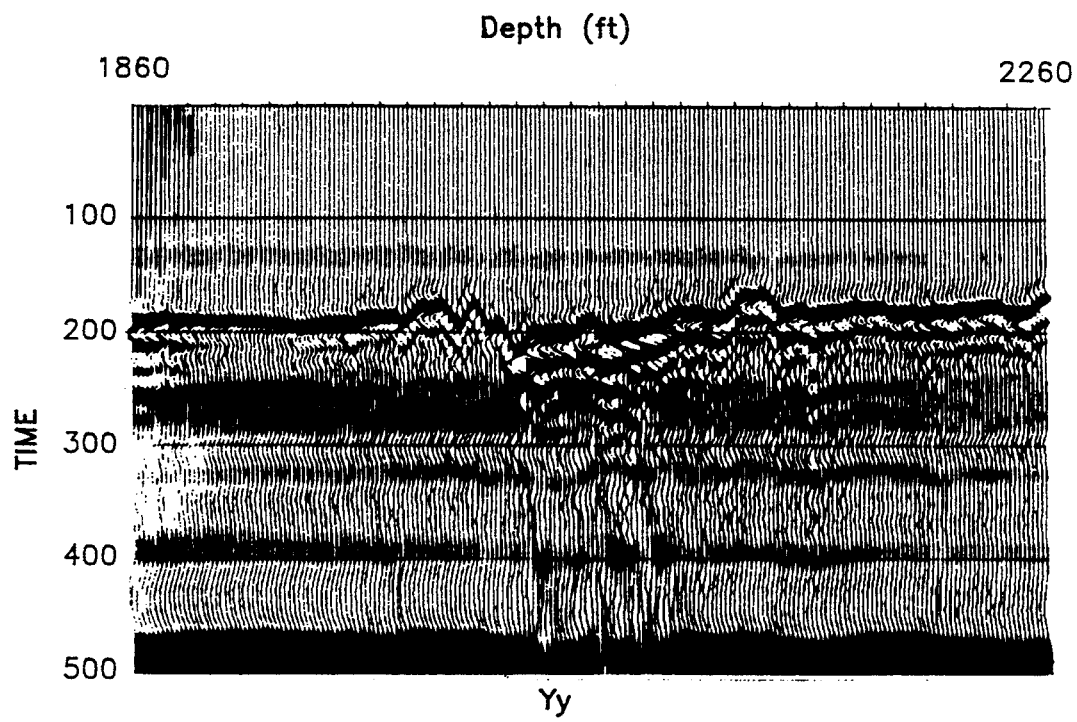
Figure 3D:
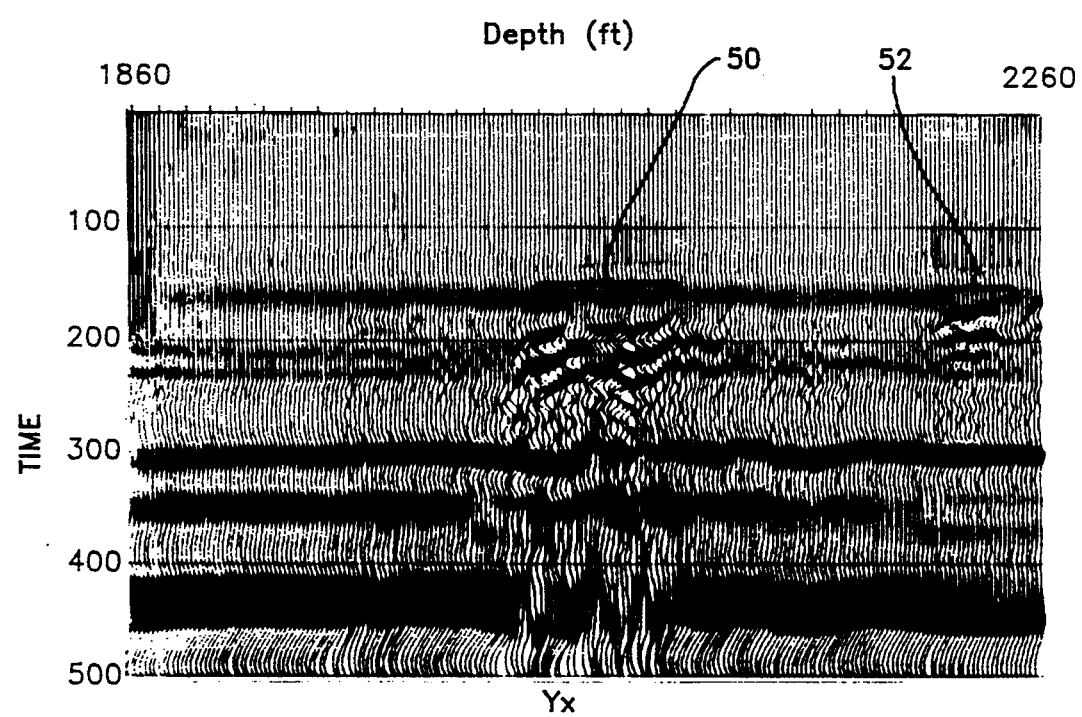

Referring now to FIG. 3A through 3D, example plots of four-component shear wave data recorded according to the present invention as a function of borehole depth with a cross-dipole tool T are shown. FIG. 3A is a plot of recorded traces Xx; FIG. 3B is a plot of recorded traces Xy; FIG. 3C is a plot of recorded traces Yy; and FIG. 3D is a plot of recorded traces Yx.

In obtaining the data displayed in these figures, the sources and receivers are either commonly aligned, as Xx (FIG. 3A) and Yy (FIG. 3C), or are orthogonal to each other, as Xy (FIG. 3B) and Yx (FIG. 3D). When the earth formations 18 adjacent the borehole 20 are isotropic or unfractured, only the data plots Xx and Yy should exhibit first arrival shear waves. No shear wave events should be present in data plots Xy and Yx because the directions or axes in which the recordings are obtained are perpendicular to the plane of particle motion.

In anisotropic formations, the shear waves divide or split into faster and slower waves which are orthogonal to each other, as has been set forth above. Further, the planes of polarization of the divided shear waves coincide or align with the axes of anisotropy in the formation rock. All four data plots then exhibit shear wave data components, unless the two shear wave sources happen to be in alignment with the axes of anisotropy. From the recorded data, possible zones of anisotropy or fracture are readily apparent as zones 50 and 52 in FIGS. 3B and 3D, due to the presence of significant amplitude shear wave components in the Xy and Yx data.

With the present invention, the four-component shear-wave seismic signal data such as that of FIGS. 3A through 3D, representing the response of the earth formation 18 adjacent borehole 16, is transformed or converted into a form more representative of the presence of in-situ vertical fractures and their orientation. The four-component signal data is subjected to a linear transformation process in a computer. The processing is done on the basis that any anisotropy in the data is caused by a set of parallel vertical fractures such as those shown at 12 in the formation 10.

A linear transformation process is performed on the received data according to the following geometric relationship between the receivers, the four-component signals recorded, and the angle between the sources, receivers, and the polarization axis for two orthogonal polarized shear waves. The relationship is as follows:

$$A = Xx - Yy = (qS_1 - qS_2) \cos(\alpha + \alpha')$$

$$B = Yx + Xy = (qS_1 - qS_2) \sin(\alpha + \alpha')$$

$$C = Xx + Yy = (qS_1 + qS_2) \cos(\alpha - \alpha')$$

$$D = Xy + Yx = (qS_1 + qS_2) \sin(\alpha - \alpha')$$

where:

Xx, Xy, Yx, Yy are four component signals recorded;

A, B, C, D are new variables formed above from the recorded four-component signals for linear-transform;

$qS_1$ and $qS_2$ are two orthogonal polarized shear waves: one faster and one slower;

$\alpha$ is the angle between geophone and polarization axis; and $\alpha'$ is the angle between one source and polarization axis.

The four equations above express four unknown quantities: the two magnitudes of $qS_1$ and $qS_2$, and the two angles $\alpha$ and $\alpha'$. The equations show time series $V_1(t) = qS_1 + qS_2$ and $V_2(t) = qS_1 - qS_2$. These time series are separated in the transformed components as linear motion. From this $V_1$ and $V_2$ can be readily determined, as are the angles $(\alpha + \alpha')$ and $(\alpha - \alpha')$. The faster shear wave amplitude $qS_1$ is the mean of the sum of $V_1$ and $V_2$. The slower shear wave amplitude $qS_2$ is the mean of the difference between $V_1$ and $V_2$. The angles $\alpha$ and $\alpha'$ can thus be determined, and the orientation of the geophones is gained from the difference between the angles $\alpha$ and $\alpha'$.

Based on this, the data are processed and transformed to a new coordinate system in which the motion of the split shear waves is linear. The transformation process on the recorded shear wave seismic data is performed preferably in a digital computer, whether portable or other type. The transformation process occurs within a time window that contains the arrivals of the split shear waves.

Figure 4A:
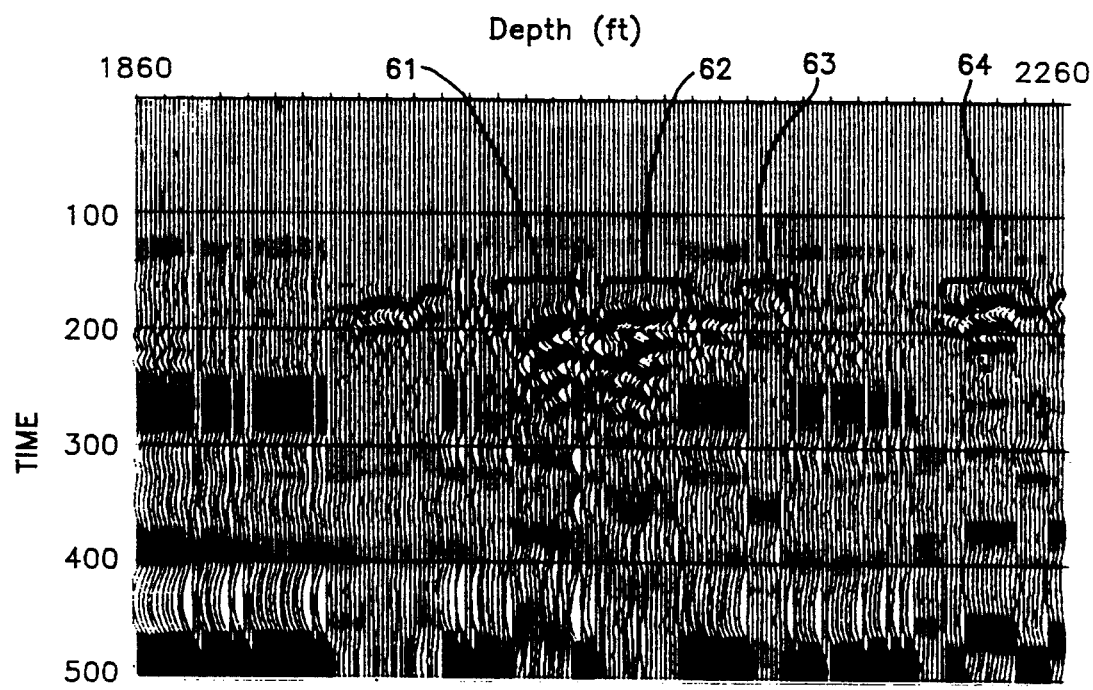
FIGS. 4A and 4B are example plots of shear wave data after processing according to the present invention.
Figure 4B:
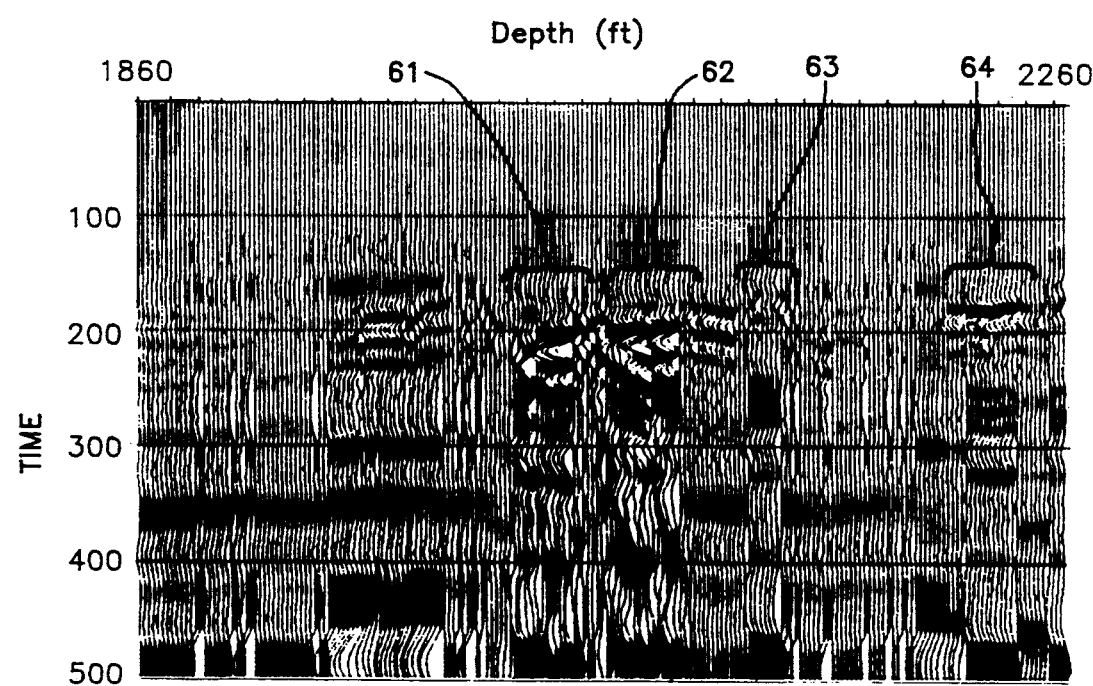

Representative plots of faster and slower shear wave components separated by the above-described linear transformation method are shown in FIGS. 4A and 4B. FIG. 4A shows the fast shear waves resulting from processing the four-component data of FIGS. 3A through 3D with the linear transformation process. FIG. 4B shows the resultant slow shear wave data from the same processing. From this data, four anisotropic zones designated with reference numerals 61, 62, 63, and 64 can be identified by the apparently strong first-arrival shear waves.

Based on the results of the transformation process, the angle that particle motion makes within the new coordinate system can be determined. Once this measurement has been made, the shear wave data are separated into their fast and slow shear wave components and the orientation of these components is determined. With knowledge of the tool orientation obtained at the same borehole depth by gyroscope 40, the orientation of the shear wave components resolves into the orientation of the anisotropy axes. A measure of the time delay between the two split shear waves is then obtained. The time delay so obtained is an indication of the amount or extent of fracturing or anisotropy in the formation. As has been set forth above, the fracture orientation is the same as the orientation of the fast shear wave.

Additionally, a calculated indication of the orientations of the downhole receiver array R with respect to the source array S is obtained. The source and receiver arrays in the tool T are actually in physical alignment, as has been set forth. The calculated orientations of the receivers based on the seismic data should be close to zero degrees. In this way, the accuracy of measurements made from field data can be readily verified.

Figure 5:
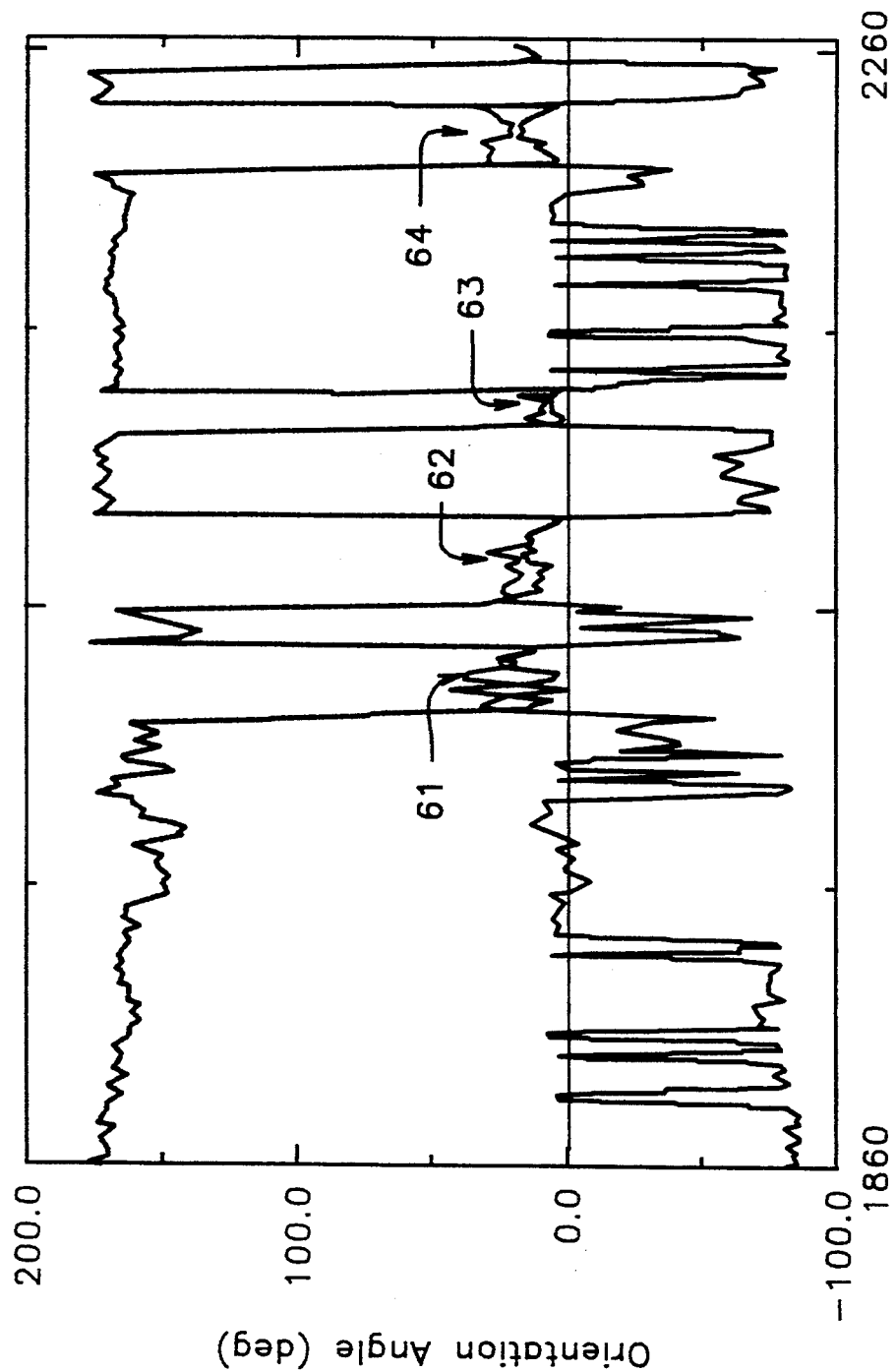
FIG. 5 is a plot of geophone orientation and fracture orientation with respect to a seismic source as a function of borehole depth obtained from the present invention.

FIG. 5 is a plot of calculated fracture and receiver orientations as a function of borehole depth for the same data shown in FIGS. 3A–3D and FIGS. 4A and 4B. It is known from the physical geometry of the logging tool T that the receiver array R and the source array S are aligned in the same direction. Accordingly, only those zones in the data of FIG. 5 where calculated orientation of receivers R to the source S is near zero degrees can be considered possible fracture zones. Further, only in those zones under consideration where there is a time delay between the fast and slow shear waves is the presence of formation fractures expected.

Figure 6:
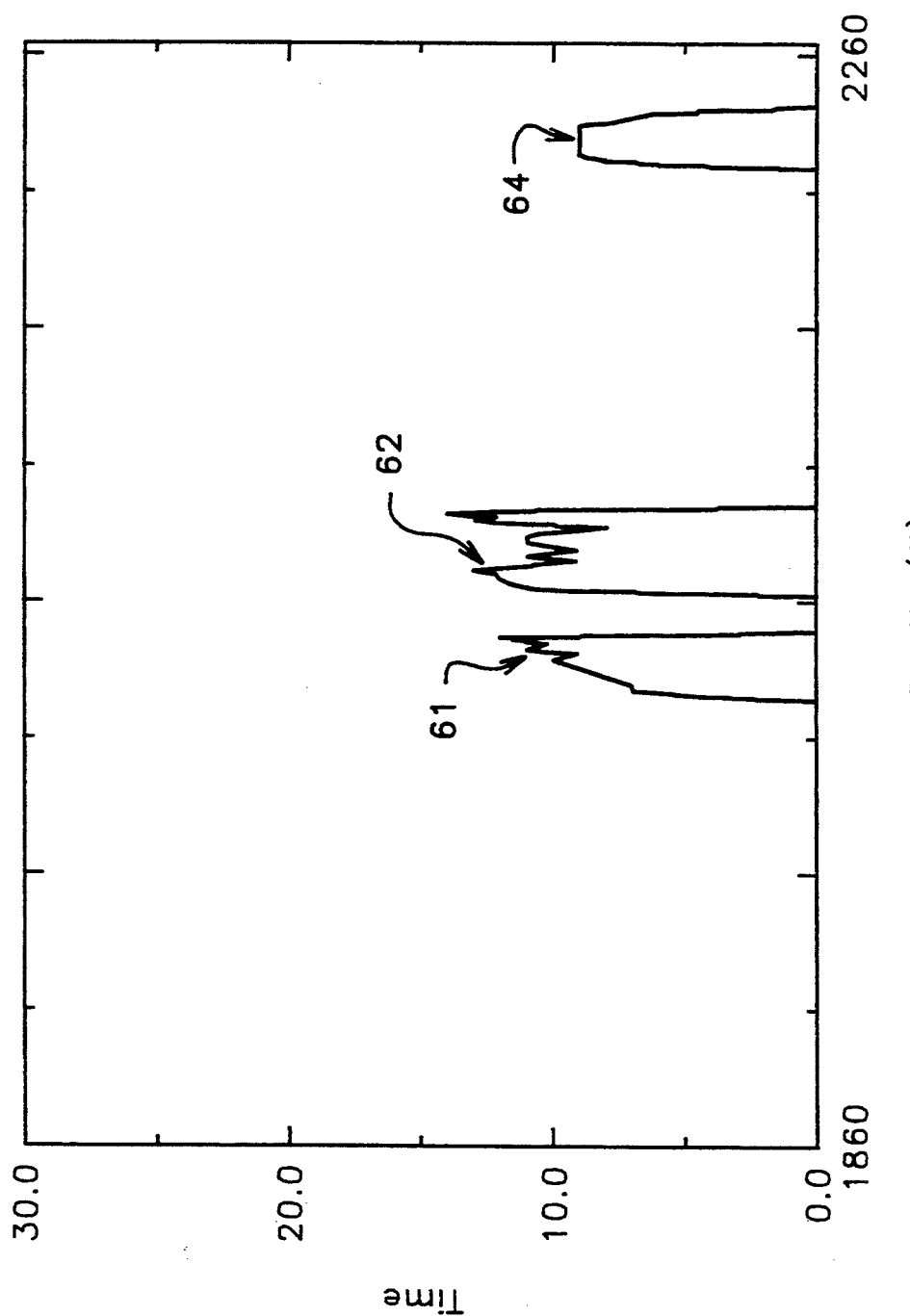
FIG. 6 is a plot of arrival time difference determined according to the present invention between shear waves displayed in FIGS. 4A and 4B.

FIG. 6 is a plot of time delay of arrival between fast and slow shear waves as a function of the same borehole depth for the data of FIG. 5. A comparison of the time delays plotted in FIG. 6, with the calculated fracture angle orientation and the source-receiver angles in FIG. 5 is then made. This comparison indicates that of the potential anisotropic zones 61, 62, 63, and 64 in FIGS. 4A and 4B, those zones designated 61, 62, and 64 are properly considered as actual fractured zones. The zone 63 is not properly considered an actual fractured zone because of no significant time delay between the two splitting shear waves.

Figure 7:
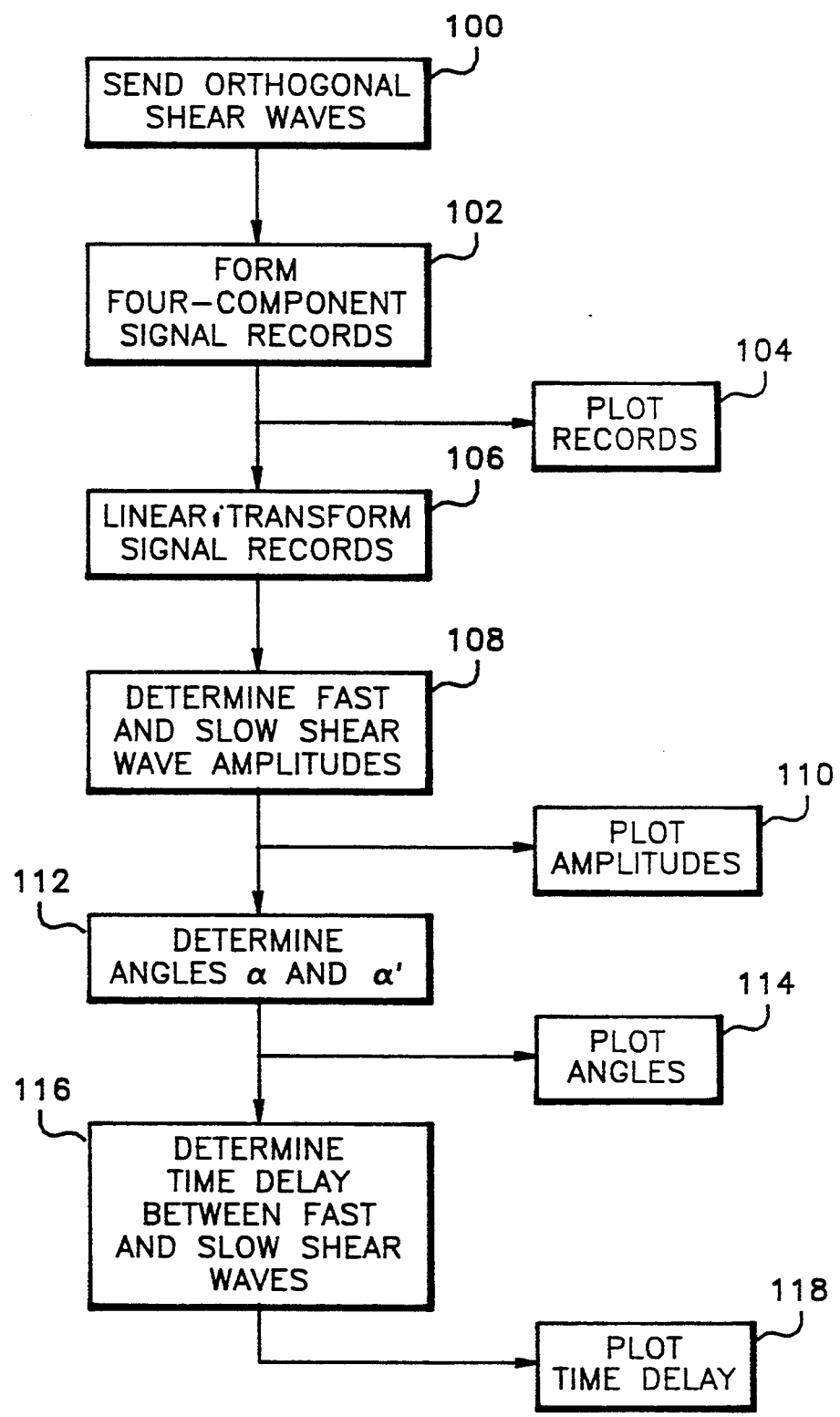
FIG. 7 is a block flow diagram of the process of the present invention.

Referring now to FIG. 7, a flow chart of the method of the present invention is shown. During a first step 100, orthogonal shearwaves are sent into the formation 18 from the source or sources in the sonde 25. Four-component signal records of shearwave data are formed during step 102. Data records of the type of FIGS. 3A through 3D may then be plotted during step 104, if desired.

The linear transformation process described above is then performed in the computer during step 106. As a result of the linear transformation, the fast shearwave $qS_1$ and slow shearwave $qS_2$ amplitudes are determined during step 108. Displays of the fast and slow shearwave amplitudes, such as shown in FIGS. 4A and 4B, may then be formed during step 110.

The angles α and α' are determined during step 112 and a display such as shown in FIG. 5 is formed during step 114. The values of the time delay between the fast and slow shearwaves are determined in step 116 and results like those of FIG. 6 are plotted during step 118.

Having described the invention above, various modifications of the techniques, procedures, material and equipment will be apparent to those in the art. It is intended that all such variations within the scope and spirit of the appended claims be embraced thereby.

We claim:

1. A method of obtaining a measure of vertical fractures in subsurface formations adjacent well boreholes, comprising the steps of:
   positioning a logging tool at a depth of interest in the well borehole with two orthogonal shear wave seismic sources and two pairs of shear wave receivers, one receiver of each pair being axially aligned with one of the seismic sources;
   sending shear wave energy into the formation from the seismic sources;
   receiving shear wave energy at each receiver in the pairs of receivers;
   transforming the received shear wave energy into planes in which the wave motion is linear; and
   resolving the shear waves into component waves of different velocities, caused by polarization of the shear wave energy, in the planes of linear wave motion to indicate possible formation fractures.

2. The method of claim 1, further including the step of:
   determining the orientation of the planes of linear wave motion.

3. The method of claim 1, further including the step of:
   determining the time delay between the different velocity shear waves to form a measure of fracture density in the formation.

4. The method of claim 3, further including the step of:
   forming an output display of the determined time delay.

5. The method of claim 1, further including the step of:
   obtaining a measure of the orientation of the logging tool with respect to a reference point.

6. The method of claim 1, further including the step of:
   obtaining a measure of the orientation of the receivers with respect to the sources to verify the accuracy of the data obtained.

7. The method of claim 1, wherein said step of resolving comprises the step of:
   resolving the shear waves into faster and slower shear wave components.

8. The method of claim 7, further including the step of:
   forming an output display of the faster and slower shear wave components.

9. The method of claim 1, further including the step of:
   forming an output display of the received four component shear wave seismic energy.

10. A method of obtaining a measure of vertical fractures in subsurface formations adjacent a well logging tool in a well borehole, comprising the steps of:
    sending shear wave seismic energy from the logging tool into the subsurface formation in orthogonal planes;
    receiving the shear wave seismic energy at a pair of seismic receivers;
    transforming the received shear wave seismic energy into faster and slower shear wave components caused by polarization of the shear wave energy in the formation; and
    determining the time delay between the faster and slower shear wave components to indicate the presence of vertical fractures in the subsurface formation.

11. The method of claim 10, further including the step of:
    transforming the received shear wave seismic energy into planes in which the wave motion is linear.

12. The method of claim 10, further including the step of:
    obtaining a measure of the orientation of the logging tool with respect to a reference point.

13. The method of claim 10, further including the step of:
    obtaining a measure of the orientation of the receivers with respect to the sources to verify the accuracy of the data obtained.

14. The method of claim 11, further including the step of:
    forming an output display of the faster and slower shear wave components.

15. The method of claim 11, further including the step of:
    forming an output display of the determined time delay.

16. The method of claim 11, further including the step of:
    determining the orientation of the planes in which the wave motion is linear.

17. The method of claim 10, wherein said step of sending comprises the step of:
    sending shear wave seismic energy from multiple seismic sources in the logging tool.

18. The method of claim 17, wherein said step of receiving comprises the step of:
    receiving the shear wave seismic energy along orthogonal axes in the seismic receivers in the logging tool.

19. The method of claim 18, wherein:
    each of said seismic receivers is located in the logging tool a common distance from a separate one of said multiple seismic sources.

20. The method of claim 10, wherein said step of sending comprises the step of:
    sending shear wave seismic energy in orthogonal planes from spaced seismic sources in the logging tool.

* * * * *